United States Patent [19]

Kubo

[11] Patent Number: 5,684,762
[45] Date of Patent: Nov. 4, 1997

[54] OPTO-MAGNETIC HEAD APPARATUS

[75] Inventor: Wataru Kubo, Tokyo, Japan

[73] Assignee: Asahi Kogaku Kogyo Kabushiki Kaisha, Tokyo, Japan

[21] Appl. No.: 418,575

[22] Filed: Apr. 6, 1995

[30] Foreign Application Priority Data

| Apr. 7, 1994 | [JP] | Japan | 6-069649 |
| Feb. 6, 1995 | [JP] | Japan | 7-018109 |

[51] Int. Cl.$^6$ .................................................. G11B 11/00
[52] U.S. Cl. ........................................... 369/13; 369/109
[58] Field of Search .................... 369/13, 112, 44.41, 369/44.37, 44.38, 44.23, 109, 103, 110, 14; 360/114, 59

[56] References Cited

U.S. PATENT DOCUMENTS

| 4,951,274 | 8/1990 | Iwnaga et al. | 369/13 |
| 5,231,620 | 7/1993 | Ohuchida | 369/112 |
| 5,247,508 | 9/1993 | Tanaka | 369/112 |
| 5,272,685 | 12/1993 | Ando | 369/112 |
| 5,278,401 | 1/1994 | Takishima et al. | 369/44.41 |
| 5,280,464 | 1/1994 | Itoh et al. | 369/44.23 |
| 5,293,371 | 3/1994 | Koyama | 369/13 |
| 5,293,569 | 3/1994 | Koyama | 369/13 |
| 5,309,423 | 5/1994 | Noguchi et al. | 369/13 |
| 5,315,574 | 5/1994 | Saimi et al. | 369/109 |
| 5,337,300 | 8/1994 | Takishima et al. | 369/112 |
| 5,453,963 | 9/1995 | Katayama et al. | 369/13 |

FOREIGN PATENT DOCUMENTS

| 0273356 | 12/1987 | European Pat. Off. . |
| 0273356 | 7/1988 | European Pat. Off. . |
| 0468800 | 7/1991 | European Pat. Off. . |
| 0539128 | 10/1992 | European Pat. Off. . |
| 0547624 | 12/1992 | European Pat. Off. . |
| 0576072 | 12/1992 | European Pat. Off. . |
| 0576072 | 6/1993 | European Pat. Off. . |
| 547624 | 6/1993 | European Pat. Off. . |
| 2-192031 | 7/1990 | Japan . |
| 5166237 | 7/1993 | Japan . |
| 5205338 | 8/1993 | Japan . |
| 5-290401 | 11/1993 | Japan . |

*Primary Examiner*—Tan Dinh
*Attorney, Agent, or Firm*—Greenblum & Bernstein, P.L.C.

[57] ABSTRACT

An opto-magnetic head apparatus including a beam splitter for splitting laser light reflected from a photomagnetic recording medium into three bundles of light having different polarization directions in a specific plane. One of the three bundles of light is used as a servo-signal and the remaining two bundles of light are used as a data-signal. A diffracting element, which splits at least the bundle of light used as a servo signal into two bundles of light in a direction perpendicular to the direction in which the splitting of the laser light by the beam splitter occurs, provides a predetermined amount of positive or negative defocus to the bundles of light split by the diffracting element. The opto-magnetic head apparatus also includes a pair of servo-signal light receiving elements which receive the bundles of servo-signal light split by the diffracting element and which are located in a plane normal to the optical axis. Two data-signal light receiving elements, which receive the bundles of the data-signal light, are located in the same plane as the servo-signal light receiving elements.

9 Claims, 10 Drawing Sheets

1

OPTO-MAGNETIC HEAD APPARATUS

BACKGROUND OF THE INVENTION

1. Field of the Invention

The present invention relates to an opto-magnetic head apparatus used for recording, reproducing or erasing data on, or from, a photomagnetic recording medium.

2. Description of Related Art

In a conventional opto-magnetic head apparatus, laser beams reflected from a photomagnetic recording medium, such as an optical disc or an optical card are split into two beams (lights) one beam for servo signals and another beam for data signals. If a known spot size method is applied to such an opto-magnetic head apparatus, the servo signal beam (light) is divided into two spots and the servo-control is designed so that when the diameters of the two spots are identical, the beams are focused on the surface of the optical disc. The focused state is maintained, in accordance with a detection signal of a light receiving element which receives the two spots of the servo signal beam. The data signal light beam is split into bundles of light having a polarization different from the servo signal light beam. The split bundles of data signal light are received by another light receiving element to obtain a data signal (magneto-optic recording signal MO).

For the opto-magnetic head apparatus as mentioned above, there have been many proposals for optical split systems which split servo signal light and data signal light, improved arrangements of the light receiving elements, or signal processing circuits of the light receiving elements. These proposals are in response to the requirement for a simple optical system and a simple arrangement of the light receiving elements for an opto-magnetic head in which no interference occurs between the servo signal and the data signal.

Moreover, there has been a long need for a simple, lightweight and compact opto-magnetic head in which various electrical or electronic circuits including a signal processing circuit are simplified.

There is, however, no opto-magnetic head hitherto known, which satisfactorily meets these requirements.

SUMMARY OF THE INVENTION

The primary object of the present invention is to provide a simple, lightweight and compact opto-magnetic head apparatus having a simple optical system and simple electric or electronic circuits including a signal processing circuit, where the arrangement of the light receiving elements is simplified and no interference between the servo-signal and the data signal occurs.

To achieve the object mentioned above, according to the present invention, there is provided an opto-magnetic head apparatus comprising a beam splitting device for splitting laser light reflected from a photomagnetic recording medium into three bundles of light having different polarization directions in a specific plane, so that one of the three bundles of light is a bundle of light for a servo-signal and the remaining two bundles of light are those for a data signal. A diffracting element splits at least the bundle of light for a servo signal into two bundles of light in a direction perpendicular to the direction in which the split of the laser light by the beam splitting device occurs and provides a predetermined amount of positive or negative defocus (focus deviation) with respect to an optical axis to the bundles of light split by the diffracting element. A pair of servo-signal light receiving elements receive the bundles of servo-signal light split by the diffracting element and are located in a plane normal to the optical axis, and two data signal light receiving elements receive the bundles of the data signal light and are located in the same plane as the servo-signal light receiving elements.

According to another aspect of the present invention, there is provided an opto-magnetic head apparatus comprising a diffracting element which splits laser light reflected from a photomagnetic recording medium into two bundles of light in a specific plane, and provides a predetermined amount of positive or negative defocus with respect to an optical axis of the split bundles of light. A beam splitting device for splitting each of the bundles of light split by the diffracting element into more than two bundles of light having different polarization directions in a plane perpendicular to the specific plane in which the splitting of the laser light by the diffracting element occurs, is provided so that one of the more than two bundles of light is a bundle of light for a servo-signal and the remaining bundles of light are for a data signal. A pair of servo-signal light receiving elements receive the bundles of servo-signal light split by the beam splitting device and are located in a plane at an equi-distance in the optical axis direction. A pair of data signal light receiving elements receive the bundles of the data signal light split by the beam splitting device and are located in the same plane as the servo-signal light receiving elements at an equi-distance in the optical axis direction identical to the axial distance of the servo-signal light receiving elements.

The present disclosure relates to subject matter contained in Japanese patent application Nos. 06-69649 (filed on Apr. 7, 1994) and 07-18109 (filed on Feb. 6, 1995) which are expressly incorporated herein by reference in their entireties.

BRIEF DESCRIPTION OF THE DRAWINGS

The invention will be described below in detail with reference to the accompanying drawings, in which.

DESCRIPTION OF THE PREFERRED EMBODIMENT

Figure 1:
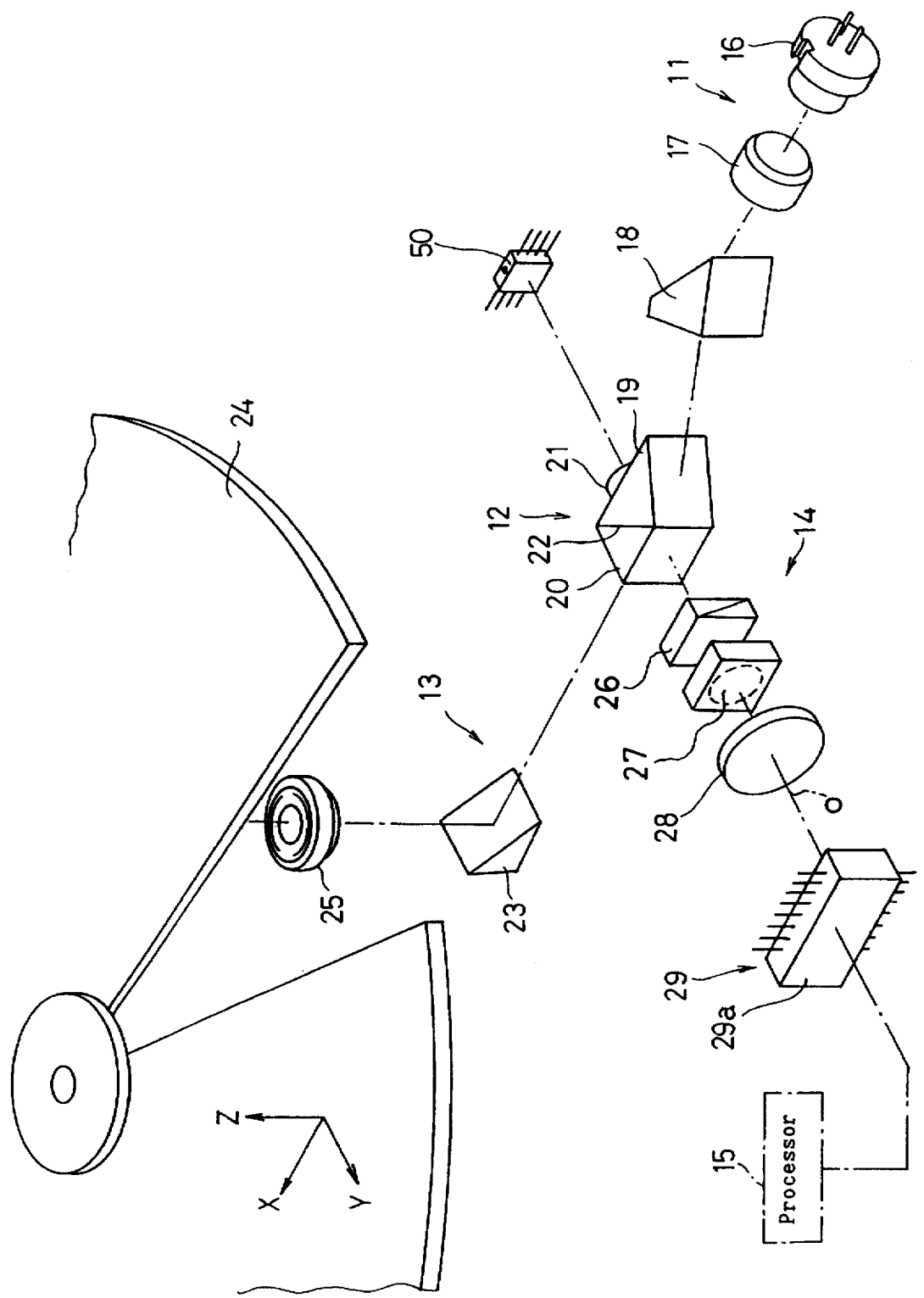
FIG. 1 is a perspective view of an opto-magnetic head apparatus, according to a first embodiment of the present invention.

FIG. 1 shows a first embodiment of a signal detecting system in an opto-magnetic head apparatus according to the present invention. The signal detecting system shown in FIG. 1 is of a single optical axis type, and is comprised of a light source 11, a prism block 12, an objective optical system 13, a signal detecting portion 14, and a signal processing portion 15.

The light source 11 is provided with a semiconductor laser (laser diode) 16 which emits divergent light, a collimating lens 17 which collimates the divergent light emitted from the semiconductor laser 16, and an anamorphic prism 18 which shapes the collimated beams transmitted through the collimating lens 17.

The prism block 12 is comprised of an anamorphic prism 19 which forms a bundle of beams transmitted through the anamorphic prism 18 into a circular shape, a condenser lens 21 and a right-angle prism 20, both adhered to the anamorphic prism 19. The connecting surface between the anamorphic prism 19 and the right-angle prism 20 is constituted by a half mirror surface 22.

A bundle of light emitted from the light source 11 is partly reflected by the half mirror surface 22 and converged by a condenser lens 21 onto a light receiving element 50, and is partly transmitted through the half mirror surface 22 and reflected upwardly by an erecting mirror prism 23. The light receiving element 50 generates a control signal for automatically controlling the output of the semiconductor laser 16 in accordance with the light incident upon the light receiving element 50.

The objective optical system 13 is comprised of the erecting mirror prism 23 which reflects a bundle of light transmitted through the anamorphic prism 19 and the half-mirror surface 22 in the upward direction, and an objective lens 25 which converges the light reflected by the mirror prism 23 onto a photomagnetic disc (photomagnetic recording medium) 24. The objective lens 25 and the erecting mirror prism 23 are provided in a head (not shown) which is moved in a radial direction X of the photomagnetic disc 24. The objective lens 25 is moved in the radial direction X by the head and in the vertical direction Z perpendicular to the direction X by an actuator (not shown) provided in the head, respectively.

The light reflected by the photomagnetic disc 24 is transmitted through the objective lens 25; is reflected by the mirror prism 23 toward the prism block 12; is reflected by the half-mirror surface 22; and is made incident upon a signal detecting portion 14. The signal detecting portion (signal detector) 14 is comprised of a Wollaston prism (beam splitting means) 26, a hologram plate (diffracting element) 27, a converging lens (condenser lens) 28, and a multiple sensor array 29.

Figure 2:
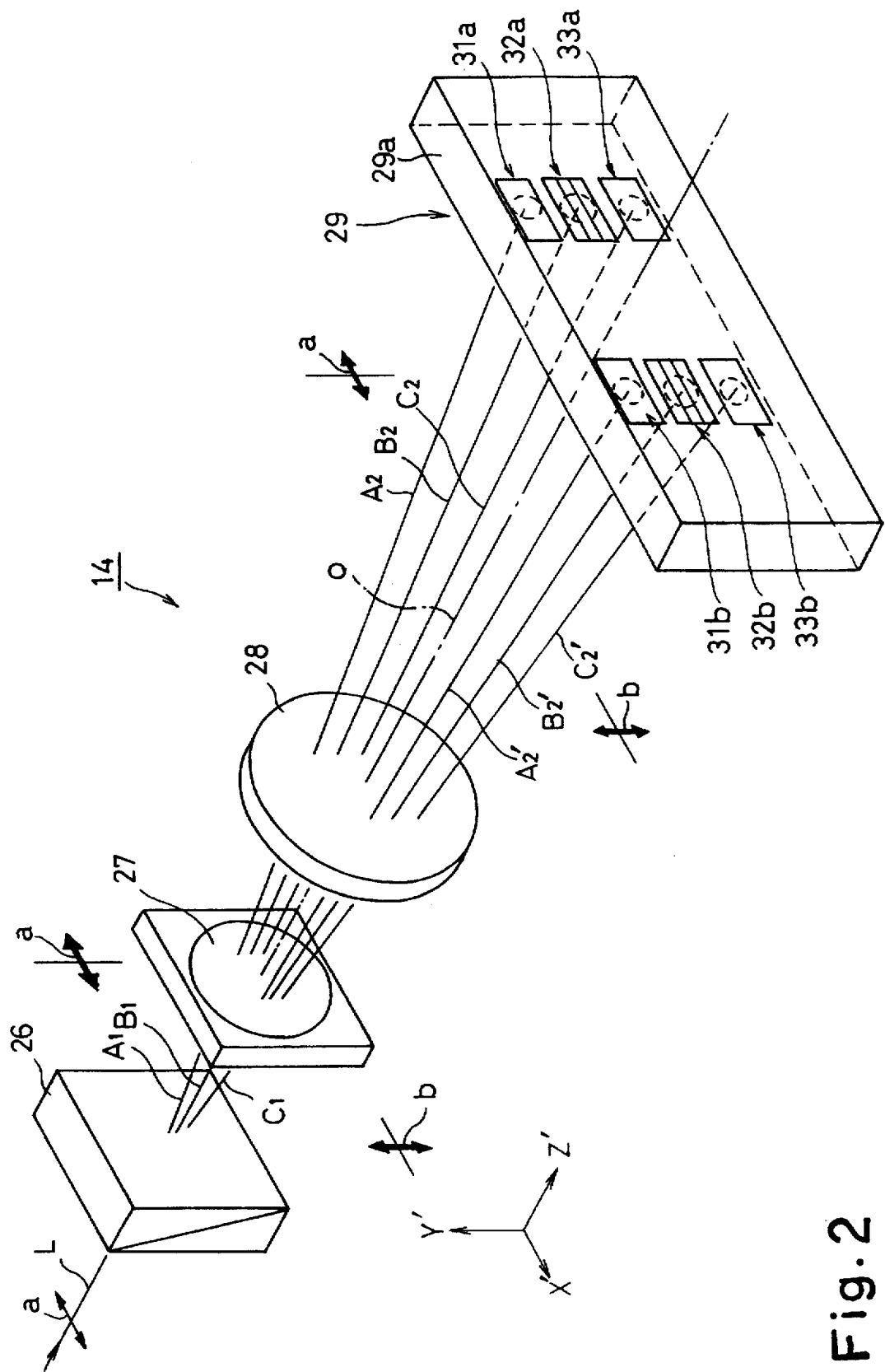
FIG. 2 is a perspective view of a signal detecting system in an opto-magnetic head apparatus shown in FIG. 1.

Referring now to FIG. 2, Wollaston prism 26, which is a crystal birefringent polarizing optical element, splits the laser beam L reflected from the photomagnetic disc 24. The reflected beam which is linearly polarized light whose polarization direction is "a", is split into three bundles of light $A_1$, $B_1$ and $C_1$ having different polarization directions in a specific plane. The Wollaston prism 26 is made of two cemented crystal members, a first crystal member whose crystal axis is rotated about the optical axis "O" by +45° or −45° with respect to the X' axis as viewed from the light incident side, and a second crystal member whose crystal axis is rotated about the optical axis "O" by +71.5° or −71.5° with respect to the X' axis to obtain a predetermined split ratio (distribution ratio) of the quantity of light. Note that the combination of the crystal axis directions of the crystal members of the Wollaston prism 26 is not limited to a combination of +45° or −45°, and +71.5° or −71.5° as mentioned above to obtain a predetermined split ratio of the quantity of light.

The bundle of light $A_1$ has a single polarization component whose polarization direction is substantially parallel with the polarization direction "a" of the bundle of light L. The bundle of light $C_1$ has a single polarization component whose polarization direction "b" is substantially perpendicular to the polarization direction "a" of the bundle of light "L". The bundle of light $B_1$ between the light $A_1$ and light $C_1$ has a polarization component having the polarization directions "a" and "b". Note that the polarization direction of the light L in FIG. 2 is not limited to the direction "a" (parallel with the axis X'), and can be a direction perpendicular to the axis X'.

The polarization direction of the light $A_1$ transmitted through the Wollaston prism 26 is not limited to the direction "a" (parallel with the axis X'). Namely, the polarization direction of the light $A_1$ depends on the split ratio of the quantity of light of the Wollaston prism 26. Similarly, the polarization direction of the light $C_1$ transmitted through the Wollaston prism 26 is not limited to the direction "b" (perpendicular to the axis X') and varies depending on the split ratio of the quantity of light of the Wollaston prism 26.

The hologram plate 27 is made of a phase type non-polarization hologram element which is formed by a conventional patterning process. In general, a hologram is formed by recording (intensity of) interference fringes which are in turn formed by an interference of a wavefront reflected by, or transmitted through, an object and a reference wavefront. Namely, the hologram is a recorded interference pattern of a defocus wavefront (spherical wave) or a tilt wavefront (inclined plane wave), etc., or a combination thereof.

Figure 11:
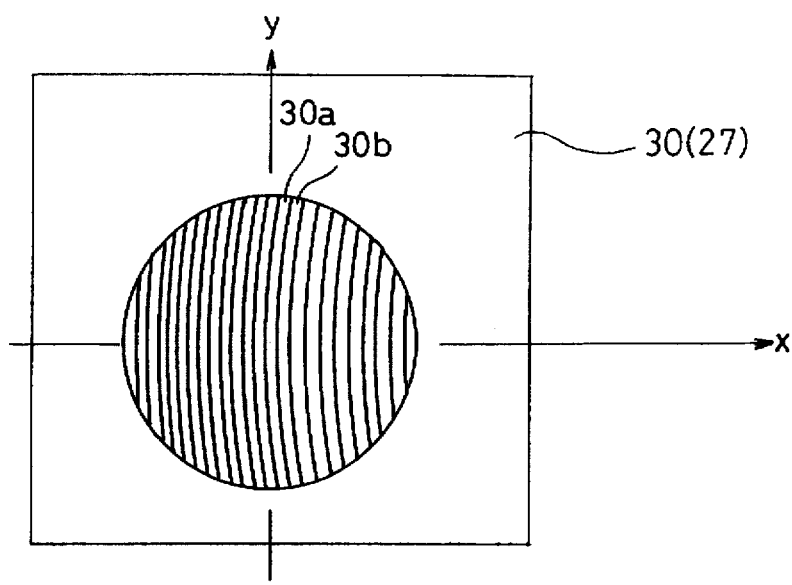
FIG. 11 is a schematic view for explaining the optical characteristics of a hologram plate used in the present invention.
Figure 12:
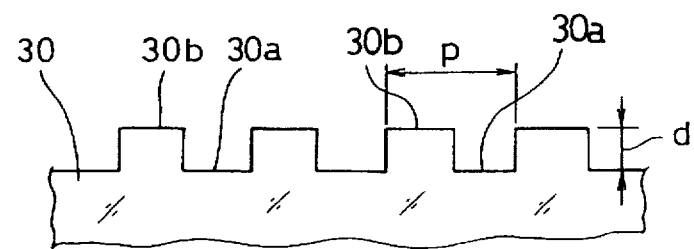
FIG. 12 is an enlarged sectional view of a hologram interferometer (plate) shown in FIG. 11.

Referring now to FIGS. 11 and 12, the hologram plate 27 is made of a transparent substrate 30 which is provided with a number of arched recesses and projections 30a and 30b which are in the form of a part of concentrical annular recesses and projections. The recesses and projections 30a and 30b are rectangular in a cross section, as shown in FIG. 12. In FIG. 11, the center of curvature of each arched recesses and projections 30a and 30b is located on the axis X. Namely, the arched recesses and projections 30a and 30b are not in the form of a concentrical annular pattern whose center is located on the center of the disc-shaped transparent substrate 30 and can be rather considered a part of a concentrical pattern whose center is shifted from the center of the substrate 30 in the direction X (axis X), as shown in FIG. 11. The duty ratio of any adjacent recess and projection 30a and 30b is approximately 1:1.

The recesses and projections 30a and 30b of the hologram plate 27 have a concentrical pattern (functions as a defocus wavefront) in which the pitch p of the recesses and the projections 30a and 30b increases (becomes dense) as represented by a quadric function toward the periphery of the substrate and a linear pattern (functions as a tilt wavefront) in which the pitch p of the recesses and projections 30a and 30b is uniformly constant in the direction of the axis X'.

Thus, light incident upon the hologram plate 27 is given by the hologram plate 27 a positive or negative tilt component (wavefront) to incline the optical axis of the incident light and a positive or negative defocus component (wavefront) in the axial direction. Consequently, a desired optical property of the optical disc head can be obtained by properly setting the two patterns.

The elements of the opto-magnetic head apparatus as constructed above are set such that when the laser beam is correctly focused on the signal recording surface of the photomagnetic disc 24, the beam spots of the bundles of light split by the hologram plate 27 have a substantially identical circular shape. If light fails to be correctly converged onto the photomagnetic disc 24 due to the movement of the photomagnetic disc 24 in the vertical direction close to or away from a horizontal plane, the beam shapes of a pair of bundles of light change, thus resulting in a difference in data obtained by a predetermined arithmetic operation described below (see FIGS. 8 to 10).

Although the projections and recesses of the hologram plate 27 have a rectangular cross section in the illustrated embodiment, the projections and recesses are not limited thereto. For instance, the projections and recesses can be in the form of a sine-wave shape, stepped, or serrated in a cross section. Moreover, the split ratio of the quantity of light can be properly determined by selecting the depth "d" of the recesses 30a (i.e., height of the projections 30b). The recesses and projections 30a and 30b of the hologram plate 27 can be formed by etching or vapor deposition of appropriate material, etc.

Referring again to FIG. 2, the three bundles of light $A_1$, $B_1$ and $C_1$, split by the Wollaston prism 26 in the vertical direction Y', in FIG. 2 into two bundles of light $A_2$, $A_2'$; $B_2$, $B_2'$; and $C_2$, $C_2'$ in the direction X' perpendicular to the direction Y', respectively, so that the split bundles of light are defocused in the positive and negative directions with respect to the optical axis "O" (center line) of the signal detecting system. As a result, the light L is split into six bundles of light (three pairs of light $A_2$, $A_2'$; $B_2$, $B_2'$; and $C_2$, $C_2'$). The bundles of light $A_2$, $A_2'$; and $C_2$, $C_2'$ are used as a magneto-optic recording signal MO and a pre-format signal RO (data signals), respectively. The bundles of light $B_2$, $B_2'$ are used as a focus error signal FF and a tracking error signal TE (servo-signals). The right and left beam spots formed by the three pairs of bundles of light $A_2$, $A_2'$; $B_2$, $B_2'$; and $C_2$, $C_2'$ have different diameters based on the amount of defocus provided thereto by the hologram plate 27. However, the upper and lower beam spots formed by the three pairs of bundles of light $A_2$, $A_2'$; $B_2$, $B_2'$; and $C_2$, $C_2'$ have a substantially identical diameter. Namely, the diameters of the beam spots formed by the bundles of light $A_2$, $B_2$ and $C_2$ are substantially identical to each other, and the diameters of the beam spots formed by the bundles of light $A_2'$, $B_2'$ and $C_2'$ are substantially identical to each other, but the diameters of the beam spots formed by the bundles of light $A_2$, $B_2$ and $C_2$ are different from the diameter of the beam spots formed by the bundles of light $A_2'$, $B_2'$ and $C_2'$ (see FIGS. 5 and 6 in which one of the right and left bundles of light, i.e., $A_2$, $B_2$ and $C_2$ are shown).

Figure 3:
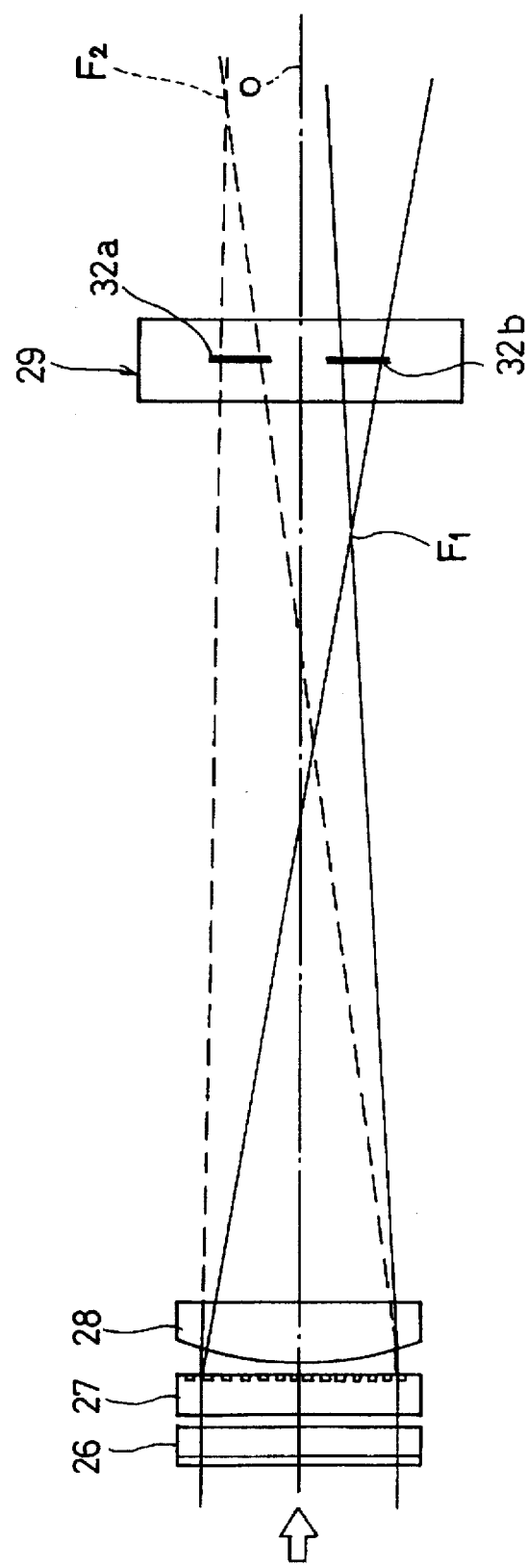
FIG. 3 is a plane view of a signal processing system shown in FIG. 2, with a removed light receiving element.
Figure 4:
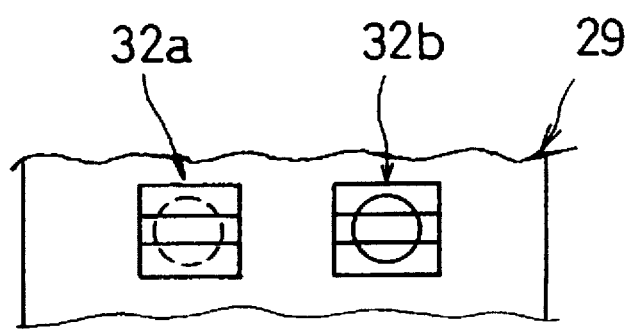
FIG. 4 is a schematic view of beam spots formed on a light receiving element for a servo signal in a signal processing system shown in FIG. 3.
Figure 5:
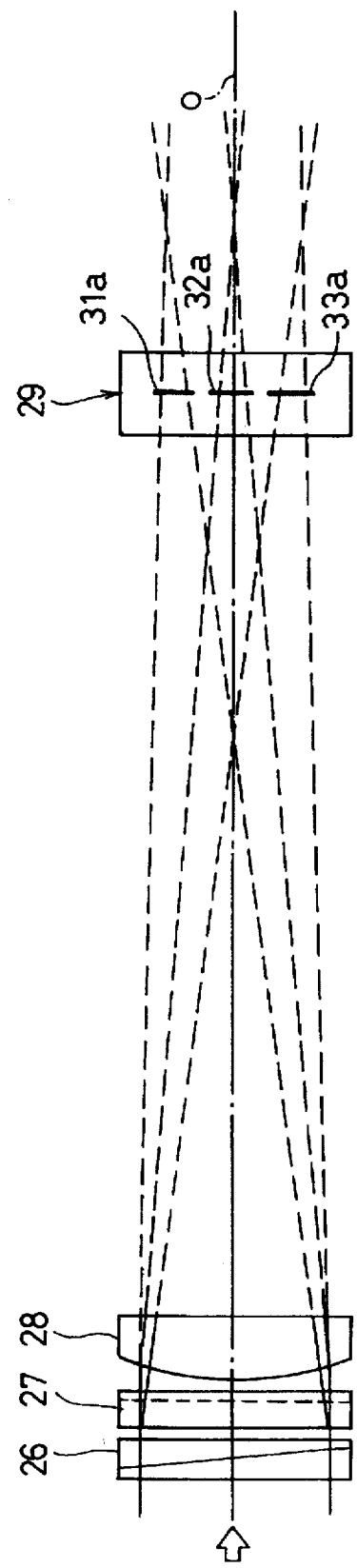
FIG. 5 is a side elevational view of a signal detecting system shown in FIG. 2.
Figure 6:
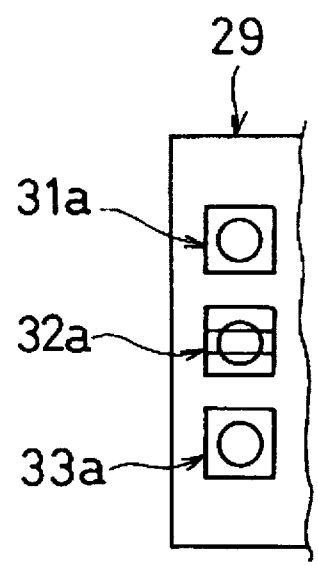
FIG. 6 is a schematic view of beam spots formed on a light receiving element in a signal processing system shown in FIG. 5.

The multiple sensor array 29 is provided with data signal light receiving elements 31a, 31b, 33a and 33b and servo light receiving elements 32a and 32b, that convert the six bundles of light to electrical signals. The six light receiving elements 31a, 31b, 32a, 32b, 33a and 33b are arranged in the same plane, normal to the light L (optical axis "O"), i.e., at the same distance in the optical axis direction. The six light receiving elements are incorporated in a single compact unit 29a. The six light receiving elements 31a, 31b, 32a, 32b, 33a and 33b of the compound sensor 29 are arranged such that they can receive the six split bundles of light $A_2$, $A_2'$, $B_2$, $B_2'$ and $C_2$, $C_2'$, respectively, as shown in FIG. 2. Namely, there are three pairs of light receiving elements 31a, 31b; 32a, 32b and 33a, 33b. The three pairs (stages) of light receiving elements are arranged in the vertical direction Y' in FIG. 2. Specifically, the two uppermost light receiving elements 31a and 31b constitute a first pair (first stage), the two intermediate light receiving elements 32a and 32b constitute a second pair (second stage), as shown in FIGS. 3 and 4 and the two lowermost light receiving elements 33a and 33b constitute a third pair (third stage), respectively. Also, the six light receiving elements 31a, 31b, 32a, 32b, 33a and 33b of the multiple sensor array 29 are grouped into two right and left groups as viewed in the horizontal direction X' normal to the vertical direction Y'. Namely, the first group (right group) consists of the three right light receiving elements 31a, 32a, and 33a, as shown in FIGS. 5 and 6, and the second group (left group) consists of the three left light receiving elements 31b, 32b, and 33b, respectively.

Figure 7:
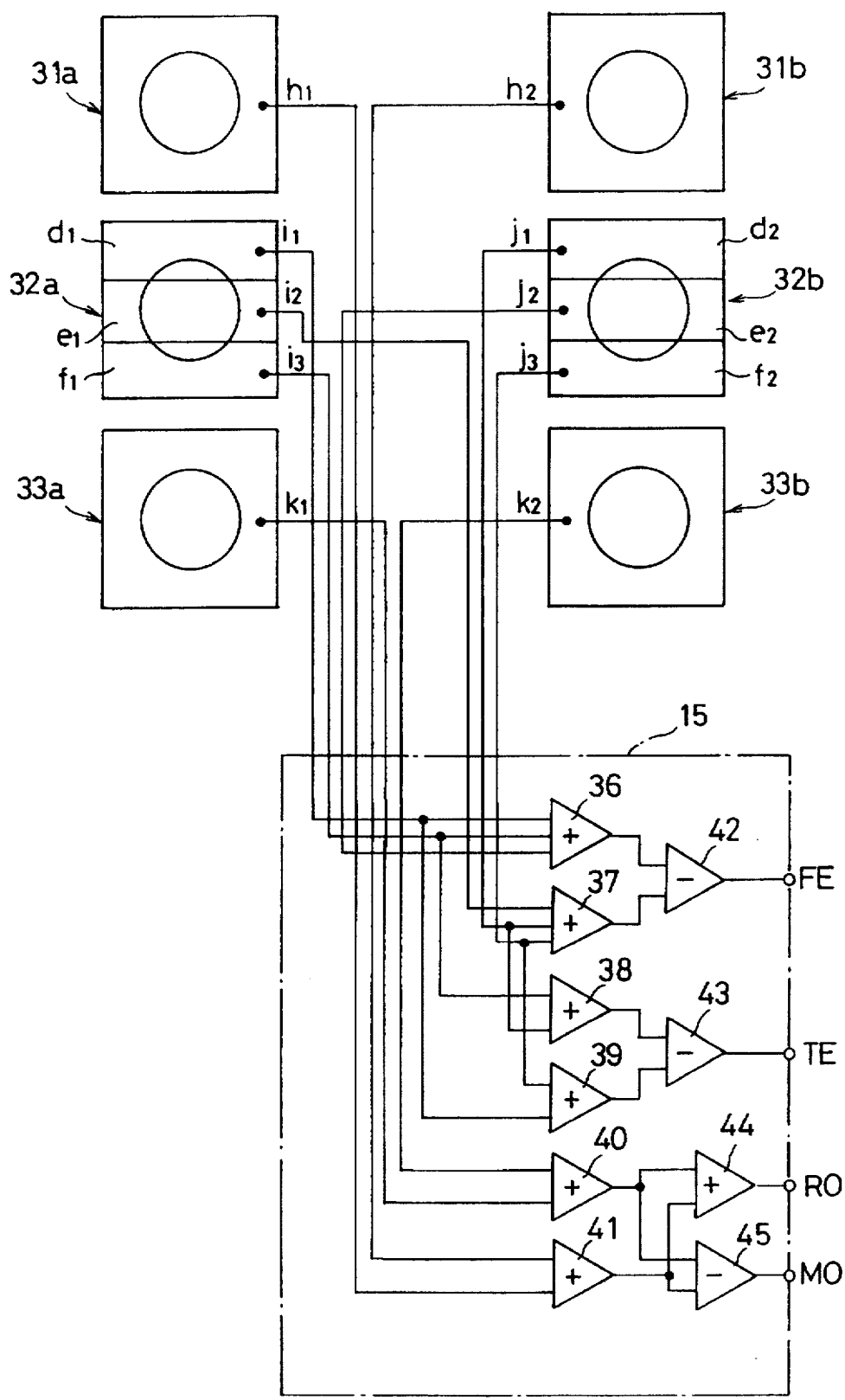
FIG. 7 is a block diagram of light receiving elements and a signal processing circuit, according to the present invention.

A pair of data signal light receiving elements 31a and 31b are adapted to detect the magneto-optic recording signal MO and the pre-format signal RO. As can be seen in FIG. 7, the data signal light receiving element 31a emits an output signal $h_1$ when it receives the bundle of light whose polarization direction is "a", transmitted through the hologram plate 27. The data signal light receiving element 31b emits an output signal $h_2$ when it receives the bundle of light whose polarization direction is "b", transmitted through the hologram plate 27.

A pair of servo-signal light receiving elements 32a and 32b are adapted to detect the focus error signal FE and the tracking error signal TE, as shown in FIG. 3. The light receiving surfaces of the servo-signal light receiving elements 32a and 32b are each split into three detecting segments (three light receiving sections) in the direction Y' in FIG. 2 (i.e., radial direction of the disc). Referring again to FIG. 7, the servo-signal light receiving element 32a emits output signals $i_1$, $i_2$ and $i_3$ corresponding to the split detecting segments $d_1$, $e_1$ and $f_1$ when the latter receive the bundle of light transmitted through the hologram plate 27. The servo-signal light receiving element 32b emits output signals $j_1$, $j_2$ and $j_3$ corresponding to the split detecting segments $d_2$, $e_2$ and $f_2$ when the latter receive the bundle of light transmitted through the hologram plate 27.

Figure 8:
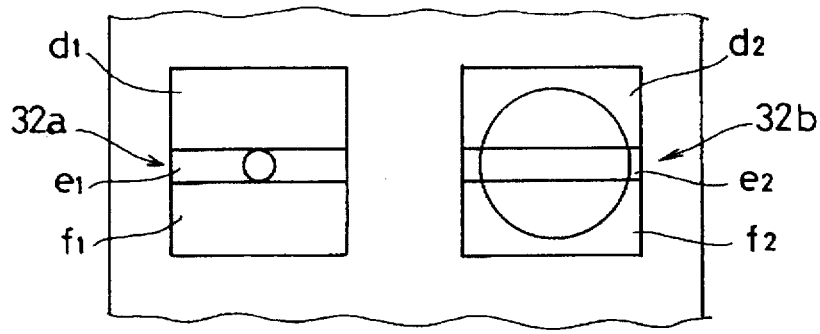
FIGS. 8, 9 and 10 are schematic views of beam spots formed on a light receiving element for a servo-signal in a compound sensor, according to the present invention.
Figure 9:
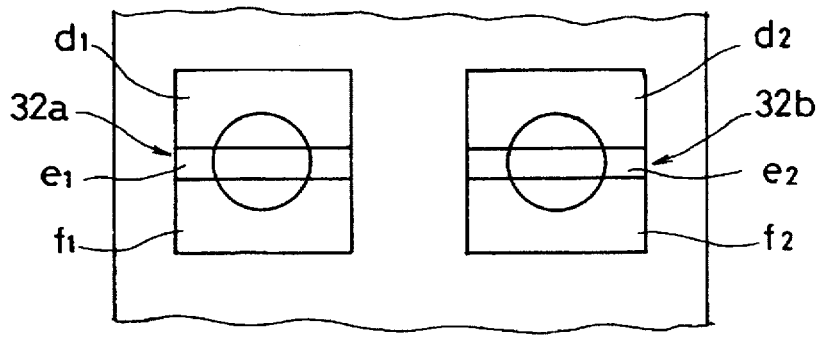
Figure 10:
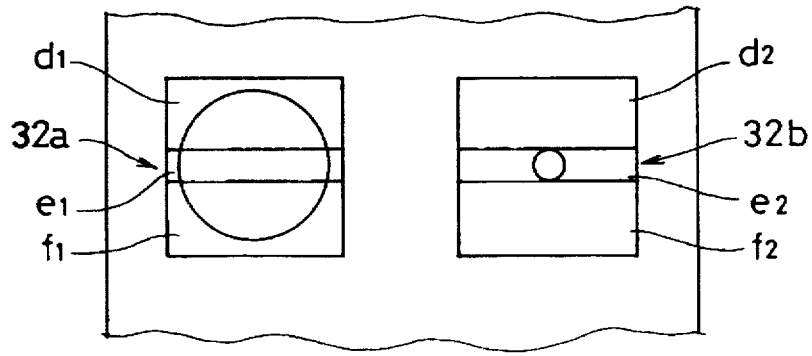

The position and diameter of the beam spots incident upon the servo-signal light receiving elements 32a and 32b are as shown in FIGS. 8 and 10 when the objective lens 25 is located close to and away from the photomagnetic disc 24, respectively. When the image is focused, the position and diameter of the beam spots incident upon the servo-signal light receiving elements 32a and 32b are identical, as shown in FIG. 9. Note that the number of the divided detecting segments of the light receiving elements 32a and 32b is not limited to three.

A pair of data signal light receiving elements 33a and 33b are adapted to detect the magneto-optic recording signal MO and the pre-format signal RO, as shown in FIG. 7. The data signal light receiving element 33a issues an output signal $k_1$ when it receives the bundle of light whose polarization direction is "a", transmitted through the hologram plate 27. The data signal light receiving element 33b issues an output signal $k_2$ when it receives the bundle of light whose polarization direction is "b", transmitted through the hologram plate 27. Note that the arrangement of the data signal light receiving elements and the servo-signal light receiving element 31a, 31b, 32a, 32b, 33a, and 33b is not limited to that shown in FIG. 2 or 7. For example, at least one pair of the two pairs of data signal light receiving elements 31a and 31b and servo-signal light receiving element 33a and 33b can be made of a single light receiving element having no split detecting segment.

The signal processor 15 is comprised of adder circuits 36 through 41, 44 and subtractor circuits 42, 43 and 45, as shown in FIG. 7. The adder 36 adds the output $i_1$ corresponding to the detecting segment $d_1$ of the servo-signal light receiving element 32a, the output $i_3$ corresponding to the detecting segment $f_1$ of the servo-signal light receiving element 32a, and the output $j_2$ corresponding to the detecting segment $e_2$ of the servo-signal light receiving element 32b and supplies the calculation result to the subtractor 42. The adder 37 adds the output $i_2$ corresponding to the detecting segment $e_1$ of the servo-signal light receiving element 32a, the output $j_1$ corresponding to the detecting segment $d_2$ of the servo-signal light receiving element 32b, and the output $j_3$ corresponding to the detecting segment $f_2$ of the servo-signal light receiving element 32b and supplies the calculation result to the subtractor 42. The subtractor 42 calculates a difference between the outputs of the adders 36 and 37 to obtain a focus error signal FE, based on the following formula:

$$FE=(i_1+i_3+j_2)-(i_2+j_1+j_3).$$

The adder 38 adds the output $i_3$ corresponding to the detecting segment $f_1$ of the servo-signal light receiving element 32a and the output $j_1$ corresponding to the detecting segment $d_2$ of the servo-signal light receiving element 32b, and supplies the calculation result to the subtractor 43. The adder 39 adds the output $i_1$ corresponding to the detecting segment $d_1$ of the servo-signal light receiving element 32a and the output $j_3$ corresponding to the detecting segment $f_2$ of the servo-signal light receiving element 32b, and supplies the calculation result to the subtractor 43. The subtractor 43 calculates a difference between the outputs of the adders 38 and 39 to obtain a tracking error signal TE, based on the following formula:

$$TE=(i_3+j_1)-(i_1+j_3).$$

The adder 40 adds the output $k_1$ of the data signal light receiving element 33a and the output $k_2$ of the data signal light receiving element 33b, and supplies the calculation result to the adder 44 and the subtractor 45. The adder 41 adds the output $h_1$ of the data signal light receiving element 31a and the output $h_2$ of the data signal light receiving element 31b, and supplies the calculation result to the adder 44 and the subtractor 45. The adder 44 calculates a sum of the outputs of the adders 40 and 41 to obtain a pre-format signal RO, based on the following formula:

$$RO=(k_1+k_2)+(h_1+h_2).$$

The subtractor 45 calculates a difference between the outputs of the adders 40 and 41 to obtain a magneto-optic recording signal MO, based on the following formula:

$$MO=(k_1+k_2)-(h_1+h_2).$$

The focus error signal FE, the tracking error signal TE, the preformat signal RO and the magneto-optic recording signal MO, thus obtained are supplied to a play-back circuit (not shown) and a servo-circuit (not shown) to perform predetermined control operations.

As can be understood from the above discussion, the opto-magnetic head apparatus according to the present invention includes the Wollaston prism 26 which splits the light L reflected by the photomagnetic disc 24 into three bundles of light $A_1$, $B_1$ and $C_1$ having different polarization directions in a specific plane, so that one (bundle of light $B_1$) of the three bundles of light is used as a servo-signal light and the remaining two bundles of light $A_1$ and $C_1$ are used as a data signal light. Each of the three bundles of light $A_1$, $B_1$ and $C_1$ split by the Wollaston prism 26 is split by the hologram plate 27 into two bundles of light in a direction perpendicular to the split direction of light by the Wollaston prism 26 to thereby obtain pairs of bundles of light $A_2$, $A_2$'; $B_2$, $B_2$'; and $C_2$, $C_2$'. The split beams $B_2$ and $B_2$' of the servo-signal light are received by the servo-signal light receiving elements 32a and 32b which are located in the same plane perpendicular to the optical axis "O". The split beams $A_2$, $A_2$' and $C_2$, $C_2$' of the bundles of data signal light are received by two pairs of data signal light receiving elements 31a, 31b and 33a, 33b that are located in the same plane as the servo-signal light receiving elements 32a and 32b, at an equi-distance in the optical axis direction, respectively.

With this arrangement, a small and lightweight opto-magnetic head apparatus in which a single optical axis type of signal detecting system including light receiving elements having a simple arrangement can be realized. Moreover, since the opto-magnetic head apparatus, which is comprised of a simple optical system, includes the light receiving elements for the servo-signal separated from the light receiving elements for the data signal, the servo-signal can be detected independently of the magneto-optic recording signal MO or the pre-format signal RO. Consequently, there is no cross-talk which would be otherwise caused by an interference between the data signal and the servo-signal. In addition, not only the signal processing circuit but also the signal processing operation can be simplified.

The three pairs of bundles of light $A_2$, $A_2$'; $B_2$, $B_2$'; and $C_2$, $C_2$' split in the lateral direction are ±1st-order diffraction light produced by the hologram plate 27, and accordingly, the focal points (convergent points) thereof are deviated on the optical axis based on the amount of defocus. Nevertheless, the diameters of the beam spots of the bundles of light $B_2$, $B_2$', $A_2$, $A_2$' and $C_2$, $C_2$' split in the vertical and horizontal directions and made incident upon the compound sensor 29 are substantially identical when the objective lens 25 is located at a focal point, since the multiple sensor array 29 including the servo-signal light receiving elements 32a, 32b and the data signal light receiving elements 31a, 31b and 33a, 33b are located on the optical axis substantially at a median point of the front and rear focal points $F_1$ and $F_2$ (see, FIG. 3). Accordingly, the position of the sensor to output appropriate focus error signal, tracking error signal, magneto-optic recording signal and pre-format signal can be easily adjusted by merely adjusting the output state of the servo-signal in accordance with the detection results of the right and left servo-signal light receiving elements 32a and 32b.

Figure 13:
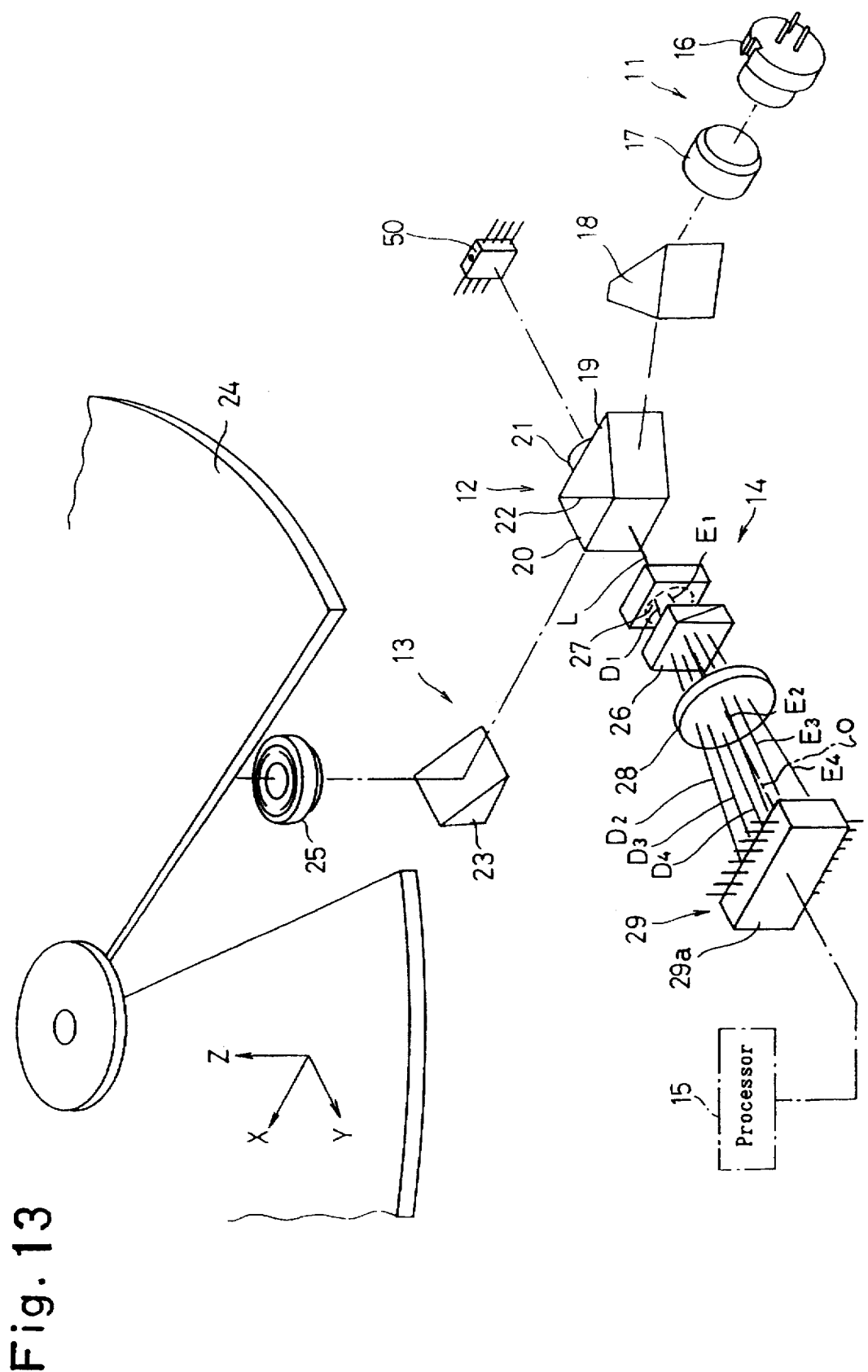
FIG. 13 is a perspective view of an opto-magnetic head apparatus, according to a second embodiment of the present invention.

FIG. 13 shows a second embodiment of the present invention, in which the positional relationship of the Wollaston prism 26 and the hologram plate 27 are reversed compared to that in the first embodiment illustrated in FIG. 1. The other elements in the second embodiment illustrated in FIG. 13 are the same as those in the first embodiment.

In the second embodiment (FIG. 13), the laser light L reflected by the photomagnetic disc 24 is split into two bundles of light $D_1$ and $E_1$ in a specific plane by the hologram plate 27 which also provides a predetermined amount of negative or positive defocus with respect to the optical axis "O" to the split bundles of light $D_1$, $E_1$. The split beams $D_1$ and $E_1$ obtained are each split into three bundles of light $D_2$, $D_3$, $D_4$ and $E_2$, $E_3$, $E_4$ by the Wollaston prism 26 in a plane perpendicular to the specific plane in which the laser light is split by the hologram plate 27, respectively. Among the pairs of bundles of light $D_2$, $E_2$; $D_3$, $E_3$; and $D_4$, $E_4$, the second pair of bundles $D_3$ and $E_3$ are used as a servo-signal light, and the first and third pairs of bundles $D_2$, $E_2$; $D_4$ and $E_4$ are used as a data signal light, respectively. In the second embodiment, a pair of servo-signal light receiving elements 32a and 32b are provided to receive the bundles of light $D_3$ and $E_3$ split by the Wollaston prism 26, and two pairs of data signal light receiving elements 31a, 31b; and 33a, 33b are provided to receive the bundles of light $D_2$, $E_2$; and $D_4$, $E_4$ split by the Wollaston prism 26. The light receiving elements 31a, 31b, 32a, 32b, 33a, and 33b are all located in the same plane at an equi-distance in the optical axis direction, similar to the first embodiment.

Consequently, according to the second embodiment, a compact and lightweight opto-magnetic head apparatus in which a single optical axis type of signal detecting system which includes light receiving elements having a simple arrangement can be realized similar to the first embodiment. Moreover, since the opto-magnetic head apparatus, which is comprised of a simple optical system, includes the the light receiving elements for servo-signal, separated from the light receiving elements for data signal, the servo-signal can be detected independently of the magneto-optic recording signal MO or the pre-format signal RO. Consequently, there is no cross-talk which would be otherwise caused by an interference between the data signal and the servo-signal. In addition, not only the signal processing circuit but also the signal processing operation can be simplified.

Furthermore, the position of the sensor to output appropriate focus error signal, tracking error signal, magneto-optic recording signal and pre-format signal can be easily adjusted merely by adjusting the output state of the servo-signal in accordance with the detection results of the right and left servo-signal light receiving elements 32a and 32b.

If a polarization beam splitter (PBS) is used, the incident light is split into transmitted light and reflected light (two optical axes). This results in an increased in the number of the reflecting surfaces signal detecting system. However, in the first and second embodiments of the present invention mentioned above, a PBS is not used, and instead thereof, a Wollaston prism 26 and a hologram plate 27 having transmission surfaces only are used. These can be mass-produced, and can perform multiple splitting of the beams. Therefore, the probability of a positional error of the optical elements in the first or second embodiment can be reduced because of the fewer number of the reflective surfaces. Hence, the servo signal is more stably produced, thereby leading to a higher yield apparatus. Moreover, since a relatively expensive PBS is not employed in the present invention, the manufacturing cost can be reduced. In addition to the foregoing, in the first and second embodiments of the present invention, since the pairs of light receiving elements 31a, 31b; 32a, 32b; and 33a, 33b are arranged in parallel with the axis X (FIG. 2), the incident positions of the six corresponding bundles of light can be easily adjusted.

If the condenser lens 28 used in the first and second embodiments has a small numerical aperture NA, the hologram plate 27 and the Wollaston prism 26 can be provided in the optical path behind the condenser lens 28 (i.e., closer to the multiple sensor array 29) in place of the same.

Although the hologram plate 27 is employed as a diffracting optical element to split the bundle of light into two bundles of light in a direction perpendicular to the direction in which the bundle of light is split by the Wollaston prism 26 in the first and second embodiments, it is possible to replace the hologram plate 27 with any optical member which has a similar function of splitting the same bundle of light into a pair of bundles of light.

As can be understood from the above discussion, according to the present invention, a compact and lightweight opto-magnetic head apparatus having a simple optical system can be provided, wherein no interference of the servo-signal and the data signal occurs; the arrangement of the light receiving elements is simplified; and the circuits including the signal processing circuit and the signal processing operation are simplified.

I claim:

1. An opto-magnetic head apparatus, comprising;

beam splitting means for splitting laser light reflected from a photomagnetic recording medium into three bundles of light having different polarization directions in a specific plane, one of said three bundles of light is for a servo-signal and the remaining two bundles of light are for a data signal;

a diffracting element which splits at least said one bundle of light for a servo-signal into two bundles of light in a direction perpendicular to the direction in which the split of the laser light by said beam splitting means occurs, and provides a predetermined amount of positive or negative defocus with respect to an optical axis to said bundles of light split by said diffracting element;

a pair of servo-signal light receiving elements which receive said bundles of servo-signal light split by said diffracting element, said servo-signal light receiving elements located in a plane normal to the optical axis; and two data-signal light receiving elements which receive said bundles of said data-signal light, said data signal light receiving elements located in the same plane as said servo-signal light receiving elements.

2. An opto-magnetic head apparatus according to claim 1, wherein each of said two data-signal light receiving elements comprises a pair of elements, said two bundles of data-signal light are split, and each of said split bundles of light is received by a respective one of said pairs of elements.

3. An opto-magnetic head apparatus according to claim 1, said beam splitting means comprises a birefringent crystal polarization element, and said diffracting element comprises a non-polarization phase hologram element.

4. An opto-magnetic head apparatus according to claim 3, wherein said crystal polarization element comprises a Wollaston prism.

5. An opto-magnetic head apparatus according to claim 1, wherein said servo-signal light receiving elements and said data-signal light receiving elements are incorporated into a single unit.

6. An opto-magnetic head apparatus, comprising:

a diffracting element which splits laser light reflected from a photomagnetic recording medium into two bundles of light in a specific plane and provides a predetermined amount of positive or negative defocus with respect to an optical axis to said split bundles of light;

beam splitting means for splitting each of said bundles of light split by said diffracting element into three bundles of light having different polarization directions in a plane perpendicular to the specific plane in which the splitting of the laser light by the diffracting element occurs, so that one of said three bundles of light is for a servo-signal and the remaining bundles of light are for a data signal;

a pair of servo-signal light receiving elements which receive said bundles of servo-signal light split by said beam splitting means, said pair of servo-light receiving elements located in a plane normal to the optical axis; and a pair of data-signal light receiving elements which receive the bundles of the data-signal light split by said beam splitting means, said data-signal light receiving elements located in the same plane as said servo-signal light receiving elements.

7. An opto-magnetic head apparatus according to claim 6, wherein said beam splitting means comprises a birefringent crystal polarization element, and wherein said diffracting element comprises a non-polarization phase hologram element.

8. An opto-magnetic head apparatus according to claim 7, wherein said crystal polarization element comprises a Wollaston prism.

9. An opto-magnetic head apparatus according to claim 6, wherein said servo-signal light receiving elements and said data signal light receiving elements are incorporated in a single unit.

* * * * *